(12) United States Patent
Hall

(10) Patent No.: US 10,058,940 B2
(45) Date of Patent: Aug. 28, 2018

(54) IMPACT CUTOFF

(71) Applicant: National Machinery LLC, Tiffin, OH (US)

(72) Inventor: Aaron T. Hall, Carey, OH (US)

(73) Assignee: NATIONAL MACHINERY LLC, Tiffin, OH (US)

( * ) Notice: Subject to any disclaimer, the term of this patent is extended or adjusted under 35 U.S.C. 154(b) by 246 days.

(21) Appl. No.: 14/875,985

(22) Filed: Oct. 6, 2015

(65) Prior Publication Data

US 2017/0095866 A1 Apr. 6, 2017

(51) Int. Cl.
*B23D 23/00* (2006.01)
*B26D 3/16* (2006.01)
*B21K 27/06* (2006.01)
*B26D 5/16* (2006.01)

(52) U.S. Cl.
CPC ............. *B23D 23/00* (2013.01); *B21K 27/06* (2013.01); *B26D 5/16* (2013.01); *B26D 3/16* (2013.01)

(58) Field of Classification Search
CPC . Y10T 83/404; Y10T 83/412; Y10T 83/8872; Y10T 83/8825; B21D 43/282; B21D 43/285; B23D 23/00; B23D 23/04; B23D 21/00; B26D 3/16; B21K 27/06; B21F 5/00; B21F 11/00; B21C 1/16–1/34; B25D 17/24; B25D 17/245; B25D 17/00; B25D 17/06; B25D 17/11; B25D 11/12; B25D 11/125; B25D 2217/0073; B25D 2217/0096; B25D 9/04; B25D 11/04; B21J 7/06; B21J 7/08; E21B 1/00; E21B 1/02; E21B 4/14–4/145

USPC ............. 29/34 D, 33 F; 140/123.6, 139
See application file for complete search history.

(56) References Cited

U.S. PATENT DOCUMENTS

| 2,404,901 | A | * | 7/1946 | Cibs | B23D 21/14 269/288 |
|---|---|---|---|---|---|
| 3,528,649 | A | * | 9/1970 | Jacob | B60G 11/18 267/273 |
| 3,886,829 | A | | 6/1975 | Criblez | |
| 4,036,089 | A | | 7/1977 | Criblez | |
| 4,721,025 | A | * | 1/1988 | Chang | B23D 15/00 470/87 |
| 4,802,538 | A | * | 2/1989 | Hays | E02D 7/08 173/1 |
| 6,655,249 | B1 | | 12/2003 | Godtner | |
| 2006/0032353 | A1 | * | 2/2006 | Dahlberg | B23D 15/12 83/82 |
| 2010/0288098 | A1 | * | 11/2010 | Matsuura | B23D 47/123 83/830 |

FOREIGN PATENT DOCUMENTS

EP 0703025 A1 3/1996
JP 2003-220443 A 8/2003

\* cited by examiner

*Primary Examiner* — Stephen Choi
*Assistant Examiner* — Evan MacFarlane
(74) *Attorney, Agent, or Firm* — Pearne & Gordon LLP

(57) ABSTRACT

An impact cutoff device for a progressive high speed cold former having a low mass rigid cutter carriage, a torsion spring for carriage return, and an articulated, oil lubricated and dampened carriage drive block on a pivoting drive lever serving to reduce impact induced vibration otherwise leading to fatigue failure and wear of the various cutter parts and consequent loss of cutoff accuracy and quality.

6 Claims, 3 Drawing Sheets

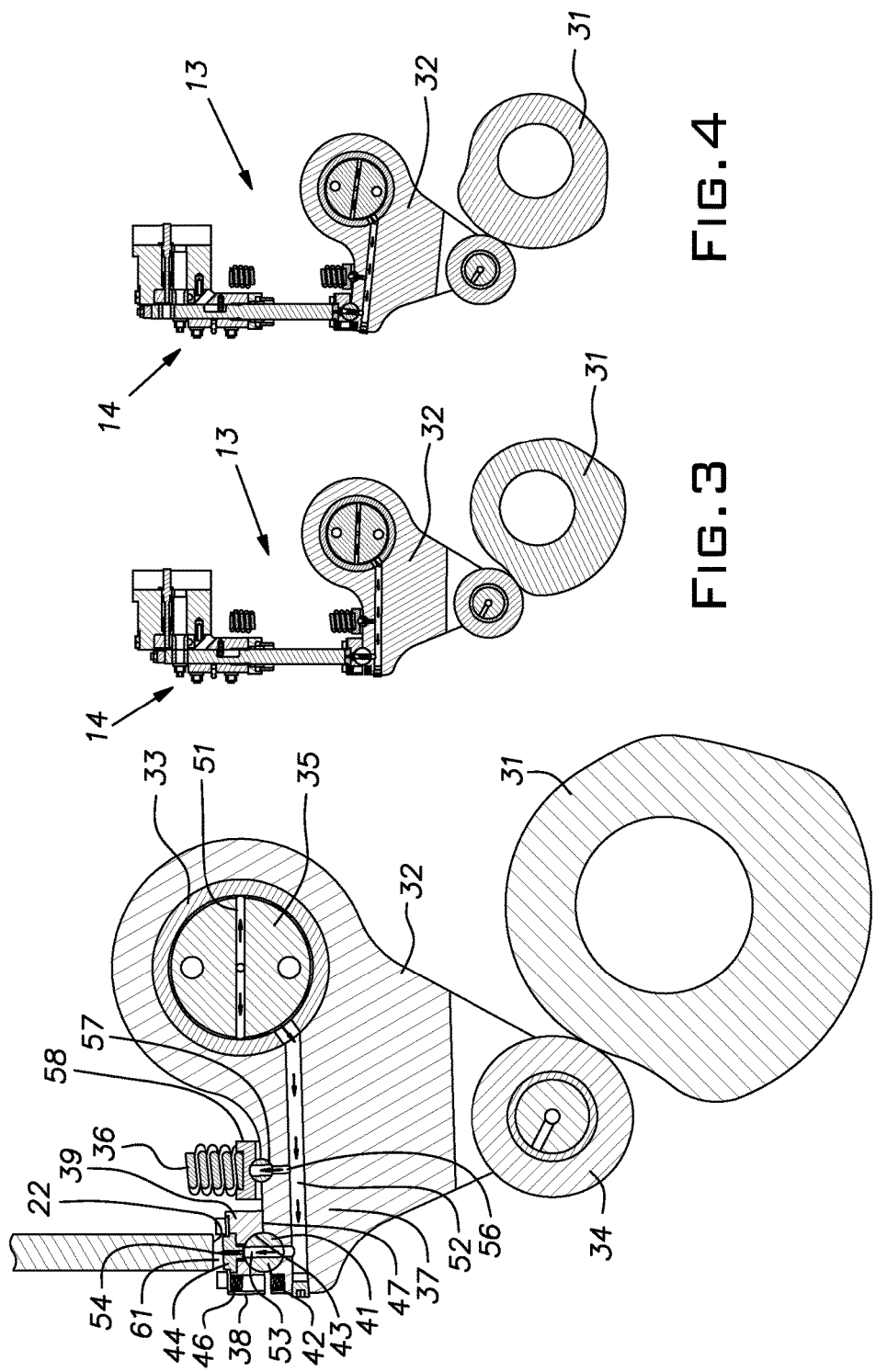

IMPACT CUTOFF

BACKGROUND OF THE INVENTION

The invention relates to blank cutoff apparatus for progressive cold forming machines.

PRIOR ART

For cutting wire and bar stock, it is common to use enclosed circular sleeves as cutter blades, one movable with a cutter carriage (cutter) and the other fixed (quill). Reducing the diametrical clearance in the cutter blades is known to improve the quality of cutoff as well as to maintain control of the blank after it has been sheared.

With minimal clearance between the cutting or shearing blades and the wire, and because the wire shears at the very beginning of the shearing motion, there is minimal distance for a cutter carriage to accelerate to a significant velocity. Thus, most high velocity cutter mechanisms accelerate a driving member to the desired velocity prior to engaging the cutter carriage.

Prior art impact blank cutoff devices have often been complicated, have required a high level of maintenance, and have exhibited early wear.

SUMMARY OF THE INVENTION

The invention provides an impact cutoff device for a progressive high speed cold former that is simple, reliable, and durable in design. The device is characterized by a low mass rigid cutter carriage, a torsion spring for carriage return, and an articulated, oil lubricated and dampened carriage drive block on a pivoting drive lever. These features reduce impact induced vibration otherwise leading to fatigue failure and wear of the various cutter parts and consequent loss of cutoff accuracy and quality.

BRIEF DESCRIPTION OF THE DRAWINGS

FIG. 2 is an enlarged cross-sectional view of a drive lever area of the inventive cutoff device;

FIG. 3 is a view similar to FIG. 2 showing a drive lever block aligned with a lower face of the cutter carriage at the instant of impact;

FIG. 4 shows the drive lever and associated components in their respective positions where the cutter carriage is at the end of its stroke to deliver a cut blank to a transfer pickup station;

DESCRIPTION OF THE PREFERRED EMBODIMENT

Figures 1, 5:
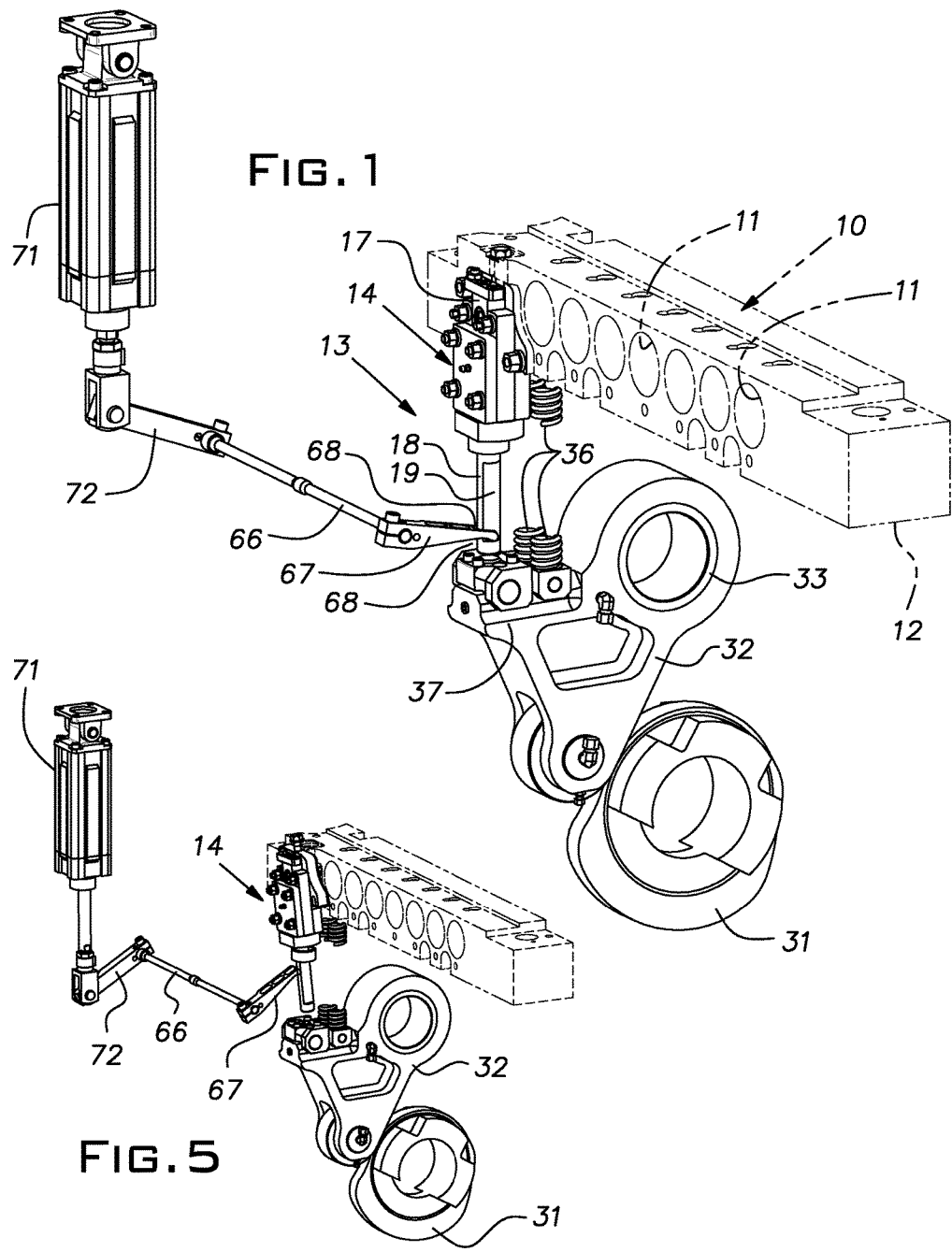
FIG. 1 is a diagrammatic isometric view of selected components of a progressive cold forming machine and the impact cutoff device of the invention.
FIG. 5, in a view like FIG. 1, shows a cutter carriage biasing torsion spring retracted for removal of a cutter cassette or pack.
Figure 8:
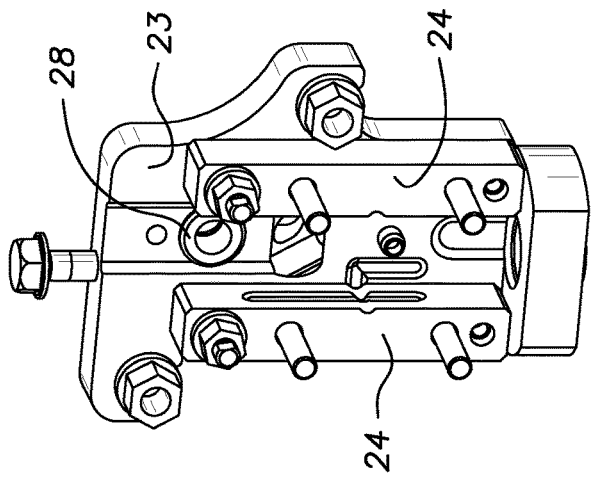
FIG. 8 is an isometric view of a base of the cutter cassette.
Figure 7:
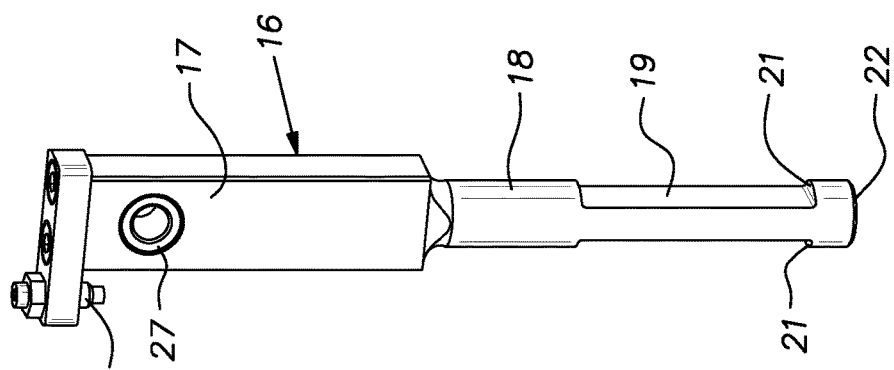
FIG. 7 is an isometric view of the cutter carriage.
Figure 6:
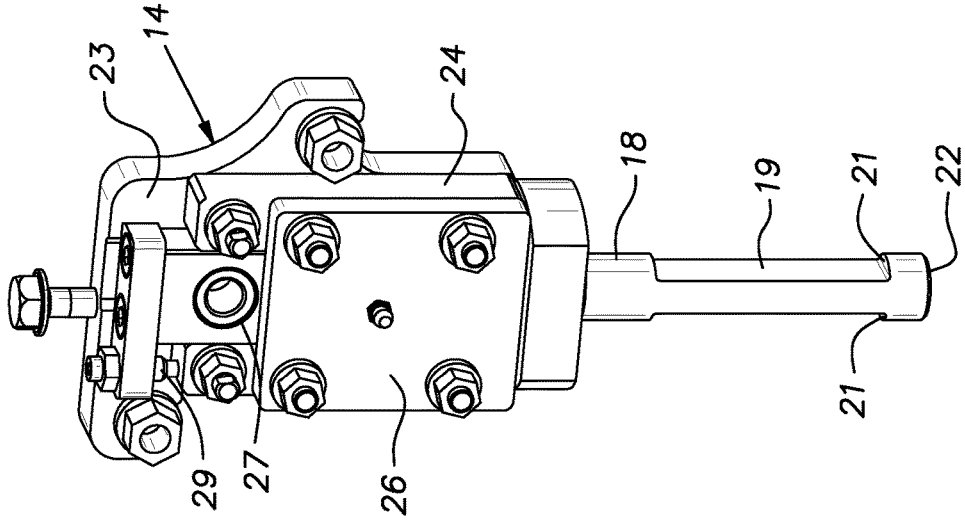
FIG. 6 is an isometric view of the cutter cassette of the invention.

A progressive cold forming machine is schematically illustrated at 10 in FIG. 1. For clarity, only a few selected components of the machine 10 are illustrated. A series of die stations 11 of a bolster 12 are evenly spaced in a horizontal array. A ram or slide, not shown, reciprocates towards and away from the bolster while carrying a horizontal array of punches or tools on centers corresponding to the die stations 11. As is customary, a transfer device (not shown) transfers a blank from one die station 11 to a successive one as the blank is progressively formed into a finished or nearly finished part. A cutoff device 13 of the invention is adjacent a first one of the die stations 11. The cutoff device 13 receives round wire and shears it into separate blanks of uniform length. The transfer device in a known manner picks up a sheared blank and moves it to the first die station. With reference to FIGS. 6-8, the cutoff device 13 includes a cutter pack or cartridge 14. The cutter pack 14 includes an elongated vertically oriented cutter carriage 16 with an upper body 17 of rectangular cross-section and a lower rod 18 integral and symmetrical with the body 17. The rod 18 has coaxial cylindrical sections at opposite ends and the narrow intermediate zone 19. The lower end of the intermediate zone 19 terminates at a pair of shoulders 21 symmetrically disposed on opposite sides of the rod 18 in a common imaginary plane perpendicular to the axis of the rod. A lower end face 22 of the rod 18 is flat and perpendicular to the longitudinal axis of the rod 18. The cutter carriage 16 is precisely guided for vertical translation in a mounting plate assembly 23 by horizontally adjustable guide bars 24 and a cover plate 26. A cutter blade 27, in the form of a cylindrical sleeve, is carried in an upper part of the rectangular carriage body 17. Similarly, a cutter blade 28, configured as a cylindrical sleeve, is carried on the mounting plate assembly 23. The guide bars 24 are horizontally adjustable to bring the cutter blade 27, 28 into horizontal alignment and a stop bolt 29 is adjustable to bring the cutter blades into vertical registration at a lowermost position of the carriage 16 in the mounting plate assembly 23 where the cutter blades register with one another and the lead end of the wire stock is received. Adjacent faces of the cutter blades 27, 28 locate the plane of shear in the blank.

The cutoff device 13 is operated by a cam 31 which, as is customary, rotates in timed relation to the cycle of the machine 10. The cam 31 oscillates a pivotal drive lever 32 which, in turn, causes the cutter carriage 16 to reciprocate thereby causing the cutter blades 27, 28 to sever a blank from a wire supply. The drive lever 32 with a sleeve bearing 33 pivots on a pin 35 (FIG. 2). The cam 31, as it rotates, pivots the drive lever 32 by contact with a cam follower 34 on the lever. It will be seen that the axii of rotation of the cam 31, the cam follower 34, and the drive lever 32 are parallel.

The drive lever 32 is biased by springs 36 to maintain the follower 34 in contact with the profile of the cam 31. The lever 32 includes an extension 37 carrying a striker block assembly 38 that engages the lower face 22 of the carriage rod 18. The pair of compression springs 36 bear against the extension 37 to keep the cam follower 34 in contact with the cam 31. The striker block assembly 38 includes a block body 39 saddled on a cylindrical pin 41 having an axis parallel to the pivot pin 35 of the drive lever 32.

The pin 41 rests in a transverse slot 42 in the lever extension 37. The block body 39 has a slot 43 of cylindrical section providing a fit over the pin 41. A circular striker or impact disk 44 is assembled in a shallow bore in the top of the block body 39. A compression spring 46 resiliently biases the block body 39, clockwise about the pin 41 in the FIGS., so that a lower face 47 of the block body 39 rests against an adjacent surface of the extension 37 when the disk 44 is not engaging the lower end face 22 of the carriage rod 18.

An oil lubrication circuit delivers oil to a top face of the striker disk 44. The circuit includes passages 51 drilled in the lever pin 35, an oil groove around this pin, passages 52 drilled in the extension 37 and respective aligned holes 53, 54 in the pivot pin 41 and striker disk 44. A branch 56 of the lubrication circuit delivers lubrication oil through a pivot pin 57 to a lower slotted face of an articulated support plate 58 supporting the drive lever biasing springs 36. The plate 58 pivots on the pin 57 to avoid eccentric loading on the springs 36.

FIG. 2 illustrates the position of the drive lever 32 at the beginning of a cutoff cycle. A gap 61 exists between the impact disk 44 and lower end face 22 of the carriage rod 18. The cam 31 accelerates the drive lever 32 to the position in FIG. 3 where the impact disk 44 strikes the carriage rod 18. By way of example, but not limitation, the speed of the impact disk 44 is preferably at least 1.5 meters/second and, more preferably, is at least 2 meters/second. The impact causes the cutter carriage 16 to assume the speed of the impact disk 44.

Nearly instantaneously, depending on the clearance between the wire stock and the cutter blades 27, 28, the cutter blades begin to shear the wire at the plane between them. The carriage mounted cutter 27 continues to move at a high speed at least until a blank is sheared from the wire supply. Typically, this occurs when the carriage cutter 27 has moved a small fraction of the diameter of the wire.

As illustrated in FIG. 3, the striker block assembly 38 is proportioned, when its lower face 47 is seated against the extension 37, so that the face of the impact disk 44 is aligned with the lower end face 22 of the carriage rod 18 at the time of their initial contact. The impact disk upper surface and end face 22 remain parallel and in full contact while the drive lever 32 pivots further under control of the cam 31. This parallelism is maintained by pivotal motion of the striker block assembly 38 relative to the lever 32 and compression of the biasing spring 46. As the drive lever 32 returns to the position of FIG. 2, the spring 46 returns the striker block assembly 38 to its illustrated position.

Pivoting of the block body 39 permits the full face of the impact disk 44 to remain in contact with the carriage rod end face 22 thereby minimizing contact pressure and wear between these surfaces. The high forces developed during actual shearing of the wire stock borne by these surfaces occurs when they are at or adjacent a plane perpendicular to the line of motion of the cutter carriage 16 and which extends through the axis of the drive lever pin 35. This geometry minimizes relative sideways movement between the impact disk 44 and carriage rod 18 thereby reducing wear of these elements.

Lubricating oil present between the impact disk 44 and carriage rod 18 from the lubrication oil circuit through the lever 32 also reduces frictional wear. The oil at this interface, additionally, dampens the shock of the impact between the impact disk 44 and rod end surface 22.

A torsion spring 66 serves to bias the cutter carriage 16 towards its lowermost position where the carriage cutter blade 27 is in alignment with the stationary cutter blade 28 in the mounting plate assembly 23. The spring 66 is supported in a bushing (not shown) adjacent each of its ends fixed to the frame of the machine 10. The torsion spring 66 has a torque arm 67 fixed on an end of the spring adjacent the drive lever 32. The torque arm is forked at a distal end so as to provide two tangs 68 that bear against the rod shoulders 21. The torsion spring 66 maintains the lower end face 22 of the cutter carriage rod 18 in engagement with the impact disk 44 of the striker block assembly 38 of the drive lever 32 through all but the most retracted part of the pivotal stroke of the drive lever. The torsion spring 66 avoids the tendency of a coil spring to exhibit a surge or shockwave when it sustains a sudden impact force. As a result, the torsion spring 66 is less susceptible to fatigue failure.

FIG. 5 illustrates a manner of releasing the torsion spring force from the carriage 16. A pneumatic cylinder actuator 71 is coupled to an arm 72 fixed on an end of the torsion spring 66 opposite the end to which the torque arm 67 is fixed. When a piston rod of the actuator 71 is extended, the torque arm 67 is raised to enable the cutter pack or cartridge 14 to be removed from the cutoff station. In normal operation, as shown in FIG. 1, the actuator arm 72 twists the torsion spring 66 to hold the torque arm 67 against the rod shoulders 21.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An impact cutter assembly for shearing blanks from wire stock comprising stationary and movable cutter blades, the movable cutter blade being mounted in a carriage that reciprocates along a line between a wire receiving position where the blades are aligned and a delivery position where the blades are displaced from one another, a striker block having a flat striker surface, the carriage having a flat carriage surface, said carriage surface being perpendicular to the line of carriage reciprocation, a driver for moving the striker surface towards the carriage surface at a velocity of at least 1.5 meters per second, the striker surface being supported in parallel relation to the carriage surface when in contact with the carriage surface, and a lubrication oil circuit for delivering lubrication oil directly to an open space between the flat striker and flat carriage surfaces whereby an impact between the flat striker surface and the flat carriage surface is damped by the presence of a film of the lubricating oil.

2. An impact cutter as set forth in claim 1, wherein the driver has a first position spaced from the carriage when the carriage is in a start position, a second position where the driver first engages the carriage in the start position, and a third position in engagement with the carriage when the carriage is at a delivery position where a blank in the movable cutter blade is located for transfer, and a torsion spring biasing the carriage against the driver when the driver is between said second and third positions.

3. An impact cutter as set forth in claim 2, including a power actuator operable to change the angular position of an end of the torsion spring remote from the carriage to release a force of the torsion spring on the carriage.

4. An impact cutter as set forth in claim 1, including a cam rotatably driven about an axis, a pivotal drive lever, and a cam follower rotatably mounted on the lever and causing the lever to pivot in response to a profile of the cam, the cam follower and lever being rotatable and pivotable about respective axii parallel to the cam axis, the carriage movable in translation along a line between the wire receiving position and the delivery position, the striker block being carried by and pivotal on the drive lever about a striker block axis parallel to the cam axis, the striker block being resiliently biased about the striker block axis against a stop surface on the drive lever, the striker block being against the stop surface and the flat striker surface being perpendicular to the line of motion of the cutter carriage at a position of the drive lever where the flat striker surface first engages the carriage, pivotal motion of the striker block enabling the flat striker surface to remain perpendicular to the line of movement of the carriage during translational movement of the cutter carriage between the wire receiving position and the delivery position.

5. An impact cutter as set forth in claim 1, wherein the lubrication oil circuit delivers lubricant through a hole in the flat striker surface.

6. An impact cutter as set forth in claim 5, including a torsion spring biasing said carriage towards said striker block.

\* \* \* \* \*